Dec. 1, 1959   R. F. McMAHAN, SR   2,914,793
SWIVEL
Filed March 14, 1957

INVENTOR
ROY FRANKLIN McMAHAN, SR.

BY  W. E. Sherwood
ATTORNEY

2,914,793
SWIVEL

Roy Franklin McMahan, Sr., Louisville, Ky.

Application March 14, 1957, Serial No. 646,048

5 Claims. (Cl. 16—161)

This invention relates to an improved swivel and, more particularly, to a reinforced swivel construction of simple components and adapted for use in furniture, as, for example, in rotatable television cabinets, swivel chairs and the like.

An object of the invention is to provide an inexpensive and reliable swivel construction adapted to support a rotatable load movable in either a horizontal plane or in a plane tilted from the horizontal.

Another object is to provide a swivel having radially reinforced members which will not sag and cause binding of the swivel bearing members after repeated usage.

Another object is to provide a swivel having sliding rather than rolling bearing surfaces and which remain effective at various angles of tilt.

Another object is to provide an improved lubricated bearing for swivels.

Another object is to provide a swivel which is silent in operation and which can be readily assembled and serviced.

Other objects and advantages will become apparent as the description proceeds and when considered in conjunction with the accompanying drawing showing a presently preferred form of swivel embodying the invention and for use in furniture.

In accordance with my invention, I provide a swivel having two reinforced cooperating members, preferably of initially identical form for reasons of economy; one of the members being attachable to a support and the other of the members being attachable to a load to be supported. A plurality of sliding contact bearing members of simple geometric form and which may be self-lubricating or may be separately lubricated, are uniformly spaced between the reinforced swivel members and thus provide a substantially uniform and dispersed, rather than concentrated loading, particularly when the swivel is operating in a tilted plane.

Figure 1:
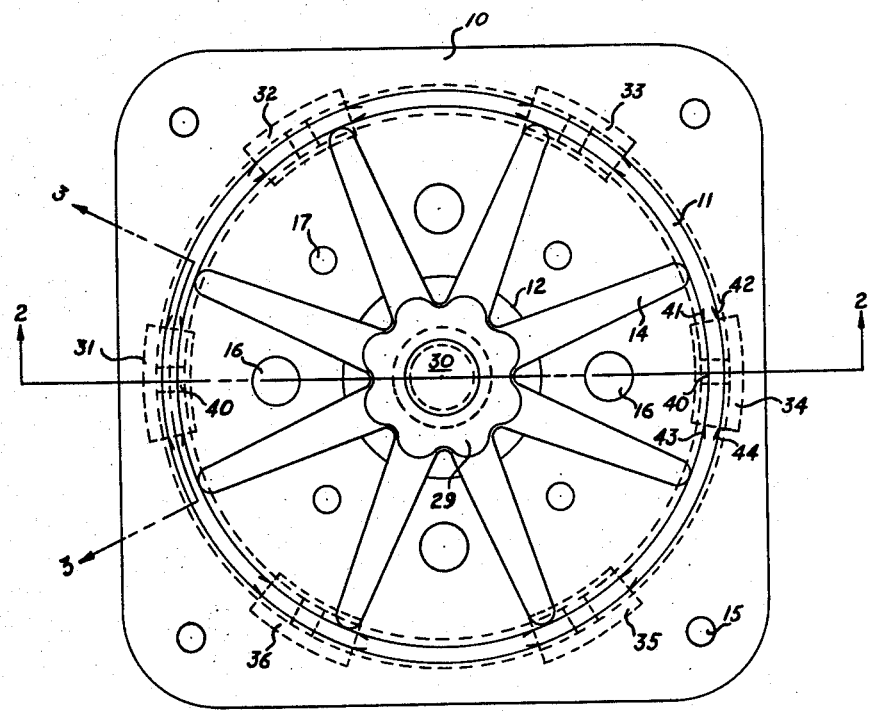
Fig. 1 is a top plan view of the swivel shown detached from its load and its support.
Figure 2:
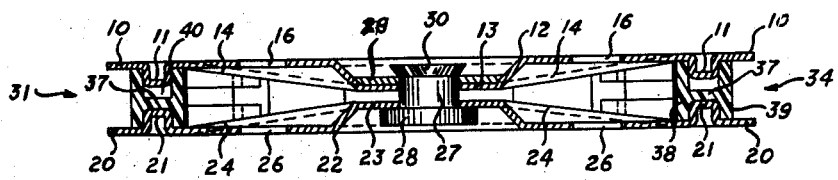
Fig. 2 is a partial sectional view taken on line 2—2 of Fig. 1.

Referring now to Fig. 1, a first member 10 which normally is attachable to a rotatable load, not shown, may conveniently comprise an originally flat sheet of metal having an annular projection 11 pressed downwardly therefrom, as best seen in Fig. 2. This projection may have any desired cross section without departing from the spirit of the invention, but I prefer to form it in a generally rectangular shape, as shown, in order to anchor the bearing members more securely against radial slippage. At a central location the member 10 is pressed downwardly, as shown by circular edge 12 and terminates in a horizontal floor section 13 having an aperture therein for a reason later to become apparent.

As a significant feature of the invention, member 10 is provided with a series of uniformly spaced reinforcing spokes 14 formed by pressing the surface of that member downwardly beginning at a radial point adjacent the inner edge of projection 11 and terminating in the plane of, and at the edge of, floor section 13. Moreover, it is preferred to have the spokes with a tapered width, the narrower portion of which is adjacent projection 11. As a result of this construction, it is found that swivel member 10 is more efficiently reinforced against torsion stresses applied along its vertical axis, as well as against bending stresses applied in the horizontal plane normally occupied by that member.

Accordingly, the swivel member 10 is not readily deformed after a period of use, and does not cause binding of the bearing member later to be described. For the purpose of mounting the swivel assembly to the support and to the supported load, a series of apertures 15 may be located at the outer periphery of the member 10 and a series of spaced large and small apertures 16 and 17 respectively may be located at intermediate portions of the member, such apertures being adapted to receive fastening means, as known in the art.

Cooperating with the above described first member is a second member 20 of originally identical construction and having an annular projection 21, a centrally apertured floor section 23 pressed from circular edge 22, a series of reinforcing spokes 24, and a series of apertures of which only the apertures 26 appear in Fig. 2.

In order to connect the first and second members in relatively rotatable relation, any suitable means may be employed. I have found that a simple rivet 27, or the like, is suitable for this purpose and that the rivet may have a lower head 28 engaging the floor 23. If desired, a washer 29 having lobes fitting into the spaces between the sides of spokes 14 may be interposed between floor 13 and the upper head 30 of the rivet in order to provide a secure, relatively rotatable mounting for the swivel members, it being understood that such washer rotates only when the first swivel member 10 rotates.

Figure 3:
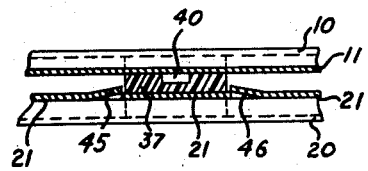
Fig. 3 is a sectional view through the center of a bearing member taken along line 3—3 of Fig. 1.

With the foregoing in mind, reference now is made to Figs. 2 and 3, showing my improved swivel bearing member. This bearing preferably comprises a plurality of separate identical elements or bearings each of which is adapted for sliding contact with the first swivel member 10 and is of arcuate form corresponding to the curvature and size of projection 11 in that member. I prefer to form the bearing members from a material such as nylon, Saran or other well known plastics which have a low coefficient of friction with metal and which normally do not require supplemental lubrication. However, the invention contemplates the use of hardwood or fibre-like materials when desired for economy of construction. The bearing member may be in the shape of a continuous ring, but I prefer to use a series of spaced, segmental ring bearing members as shown at 31, 32, 33, 34, 35 and 36. As best seen in Fig. 2, each bearing member has a generally H-shaped cross section with a central bar section 37, an inner leg section 38 and an outer leg section 39. The top of the central bar section is in contact with the lower surface of projection 11 and supports the weight of the first swivel member 10 and the load carried thereby. The length of the leg sections 38 and 39 preferably is chosen so that the upper surface of those legs are in contact with the lower surface of the first swivel member 10 and assist in the load carrying function, although this is not essential. The lower surface of central bar section 37 rests upon the upper surface of projection 21 and preferably the lower surfaces of legs 38 and 39 rest upon the upper surfaces of the second swivel member 20.

In addition, the inner surfaces of each of the legs are in contact with the sides of the confronting projections 11 and 21.

When employing bearing materials which are not self-lubricating, I may also provide a recess 40 in the upper portion of central bar section 37 for containing a suitable lubricant. As best seen in Fig. 3, this recess is spaced from the edges of the central bar section and lubricant may be dispensed therefrom at the top of the recess. As will be noted, the configuration of the bearing members is such that, when assembled in position, they are restrained against radial slippage with respect to the first and second swivel members.

Referring now to Figs. 1 and 3, the annular projection 21 of the swivel member 20 (which otherwise is identical with swivel member 10) is slitted or lanced along spaced edges 41, 42 and 43, 44 adjacent the position to be occupied by each of the bearing members. The confronting ends of these pairs of edges are joined by an edge transverse to the projection and the resulting hinged sections 45 and 46 of the annular projection are bent upwardly as seen in Fig. 3 to provide confronting anchors for the bearing member disposed therebetween. Thus, each bearing member is restrained against angular slippage with respect to the first and second swivel members.

The operation of the swivel thus described will now be evident. Upon being assembled with the fastening means 27 in place, the respective swivel members are attached to the support and to the supported load. The spacing of the several bearing members permits a uniform distribution of the load and as the upper swivel member 10 is rotated, it slides upon the upper surfaces of the relatively stationary, non-metallic bearing members in an efficient manner. In view of the sliding contact of the swivel parts, rather than a friction reducing contact, as found in ball, roller and other types of bearings, it is found that the rotatable part, when set in motion, does not tend to overrun a desired setting, or to drift therefrom when that setting is once established. Moreover, since the relatively movable metallic members 10 and 20 do not contact each other at the load bearing regions, a more silent swivel operation results.

Having thus described my invention, it is apparent that various modifications of the embodiment shown as an illustration of the invention may be made therein without departing from the true spirit and scope of the invention, and I therefore aim to cover, in the appended claims, all such equivalent variations and modifications.

What I claim as new and desire to secure by Letters Patent of the United States is:

1. A silent swivel comprising a first member adapted to be attached to an article to be supported, a second member adapted to be attached to a support, each of said members having an annular projection in confronting relation to each other, a non-metallic, arcuate, bearing member interposed between said projections and anchored against radial slippage with respect to both of said projections as well as against angular slippage with respect to one of said projections, said bearing member having an H-shaped cross section including a central bar section disposed between said projections and along which one of said projections is adapted to slide and having side leg members in contact with the sides of each of said projections, and means for holding said first and second members in assembled relatively rotatable relation to each other.

2. A swivel as defined in claim 1 wherein said bearing member is anchored between spaced portions of one of said projections, said spaced portions being bent out of the plane of said projection and being formed integrally therewith.

3. A swivel as defined in claim 1 wherein said bearing member includes a recess for lubricant, said recess facing the projection adapted to slide along said bearing member.

4. A silent swivel comprising a first member adapted to be attached to an article to be supported, a second member adapted to be attached to a support, each of said members being formed of sheet metal and having an annular projection in confronting relation to each other, a centrally disposed floor section in each of said members and a plurality of reinforcing radial spokes integral with said member and extending between said floor section and said annular projection, a non-metallic, arcuate bearing member interposed between said projections and anchored against radial slippage with respect to both of said projections, as well as against angular slippage with respect to one of said projections, said bearing member having an H-shaped cross section including a central bar section disposed between said projections and along which one of said projections is adapted to slide and having side leg members in contact with the sides of each of said projections, and means extending through said floor sections for holding said first and second members in assembled relatively rotatable relation to each other.

5. A swivel as defined in claim 4 wherein said spokes have a tapered width increasing in the direction of said central floor portions.

References Cited in the file of this patent

UNITED STATES PATENTS

| | | |
|---|---|---|
| 893,210 | Weeks | July 14, 1908 |
| 1,002,514 | Hatfield | Sept. 5, 1911 |
| 1,609,880 | Peters | Dec. 7, 1926 |
| 1,710,509 | Ottinger | Apr. 23, 1929 |
| 1,732,113 | Van Der Meer | Oct. 15, 1929 |
| 1,999,949 | Yawman | Apr. 30, 1935 |
| 2,323,957 | Zalkind | July 13, 1943 |
| 2,736,055 | Bell | Feb. 28, 1956 |
| 2,812,532 | Geiger | Nov. 12, 1957 |